(12) United States Patent
Kavalam et al.

(10) Patent No.: US 7,587,594 B1
(45) Date of Patent: Sep. 8, 2009

(54) DYNAMIC OUT-OF-PROCESS SOFTWARE COMPONENTS ISOLATION FOR TRUSTWORTHINESS EXECUTION

(75) Inventors: Jude Jacob Kavalam, Seattle, WA (US); Edward J. Praitis, Woodinville, WA (US); Jonathan C. Lew, Redmond, WA (US); Pierre-Yves Santerre, Bellevue, WA (US); Timothy D. Noonan, Cary, NC (US); Valeriy V. Tsuryk, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 860 days.

(21) Appl. No.: 10/929,339

(22) Filed: Aug. 30, 2004

(51) Int. Cl.
    *H04L 26/06* (2006.01)
(52) U.S. Cl. ...................................... 713/167
(58) Field of Classification Search .................. 713/167
    See application file for complete search history.

(56) References Cited

U.S. PATENT DOCUMENTS

| | | | |
|---|---|---|---|
| 5,311,591 A | 5/1994 | Fischer | |
| 5,915,085 A | 6/1999 | Koved | |
| 6,308,274 B1 | 10/2001 | Swift | |
| 6,338,079 B1 | 1/2002 | Kanamori et al. | |
| 6,351,811 B1 * | 2/2002 | Groshon et al. | 713/176 |
| 6,587,888 B1 * | 7/2003 | Chieu et al. | 719/313 |
| 6,728,884 B1 * | 4/2004 | Lim | 726/12 |
| 7,290,266 B2 | 10/2007 | Gladstone et al. | |
| 7,389,246 B1 * | 6/2008 | Ohrt | 705/4 |
| 2002/0087665 A1 | 7/2002 | Marshall et al. | |
| 2002/0099952 A1 | 7/2002 | Lambert et al. | |
| 2003/0004952 A1 * | 1/2003 | Nixon et al. | 707/10 |
| 2003/0023774 A1 | 1/2003 | Gladstone et al. | |

(Continued)

FOREIGN PATENT DOCUMENTS

EP 0813132 A2 12/1997

(Continued)

OTHER PUBLICATIONS

Author Unknown, Impersonation, Documentation of Windows 2000, http://www.microsoft.com/technet/prodtechnol/windows2000serv/reskit/distrib/dsce_ctl_awdg.mspx?pf=true, printed Jan. 26, 2007, 5 pages, Microsoft Corporation, USA.

(Continued)

*Primary Examiner*—Kambiz Zand
*Assistant Examiner*—Teshome Hailu
(74) *Attorney, Agent, or Firm*—Senniger Powers LLP

(57) ABSTRACT

Preventing uncontrolled access to an execution environment of a first component object by a second component object. A system includes a memory area storing the first component object, the second component object, and one or more predefined properties associated with the second component object. The system comprises a processor configured to receive a request from the first component object stored in the memory area to create the second component object stored in the memory area. The first component object executes in a first execution environment and the request specifies a requested execution environment for the second component object. The processor is also configured for analyzing the predefined properties stored in the memory area to determine an execution environment privilege associated with the second component object. The processor is configured for granting the received request as a function of the determined execution environment privilege.

32 Claims, 4 Drawing Sheets

U.S. PATENT DOCUMENTS

| | | | |
|---|---|---|---|
| 2003/0084291 A1* | 5/2003 | Yamamoto et al. | 713/168 |
| 2003/0084296 A1* | 5/2003 | Kyojima et al. | 713/171 |
| 2003/0159070 A1 | 8/2003 | Mayer et al. | |
| 2003/0172109 A1 | 9/2003 | Dalton et al. | |
| 2003/0204730 A1 | 10/2003 | Barmettler et al. | |
| 2003/0225897 A1* | 12/2003 | Krawetz | 709/229 |
| 2004/0054926 A1* | 3/2004 | Ocepek et al. | 713/201 |
| 2004/0128505 A1* | 7/2004 | Larsen | 713/169 |
| 2004/0220976 A1 | 11/2004 | Ananthanarayanan et al. | |
| 2005/0091658 A1 | 4/2005 | Kavalam et al. | |
| 2005/0228998 A1* | 10/2005 | Chan et al. | 713/175 |
| 2007/0198709 A1* | 8/2007 | Hawkinson et al. | 709/224 |
| 2007/0198724 A1* | 8/2007 | Hawkinson et al. | 709/226 |

FOREIGN PATENT DOCUMENTS

| | | |
|---|---|---|
| WO | 0192981 A2 | 12/2001 |

OTHER PUBLICATIONS

Langa, Fred, "The Langa List," available at http://www.langa.com/newsletters/2002/2002-06-03.htm, Jun. 3, 2002.

Spengler, Brad, "GRSecurity ACL Documentation," available at http://www.grsecurity.net/gracldoc.pdf, Apr. 1, 2003, 40 pages.

Spengler, Brad, "GRSecurity ACL Documentation V 1.5", grsecurity.net/gracldoc.pdf, Apr. 1, 2003, 40 pages, US.

Kavalam, "Windows 'Longhorn': Enhancements for a Trustworthy Application Experience", Microsoft Professional Developers Conference 2003 Architecture Symposium, Oct. 2003, 23 pages, http://download.microsoft.com/download/6/6/9/669C56E3-12AF-48C5-AB2A-E7705F1BE37F/CLI312.ppt, U.S.A.

Brockschmidt, "OLE Integration Technologies: A Technical Overview," MSDN Library, 17 pages, Oct. 1994, http://msdn.microsoft.com/library/default.asp?url=/library/en-us/dnolegen/html/msdn_ddjole.asp, U.S.A.

Williams, et al., "The Component Object Model: A Technical Overview," MSDN Library, 16 pages, Oct. 1994, http://msdn.microsoft.com/library/default.asp?url=/library/en-us/dncomg/html/msdn_comppr.asp, U.S.A.

Dearle, A. and Hulse, D. 2000. "Operating System Support for Persistent Systems: Past, Present and Future," Softw. Pract. Exper. 30, 4 (Apr. 2000), 295-324, John Wiley & Sons, New York, NY, USA.

Dearle, Alan, et al., "An Examination of Operating System Support for Persistent Object Systems," In 25th Hawaii International Conference on System Services, vol. 1, pp. 779-789, 1992, IEEE Computer Society Press, USA.

\* cited by examiner

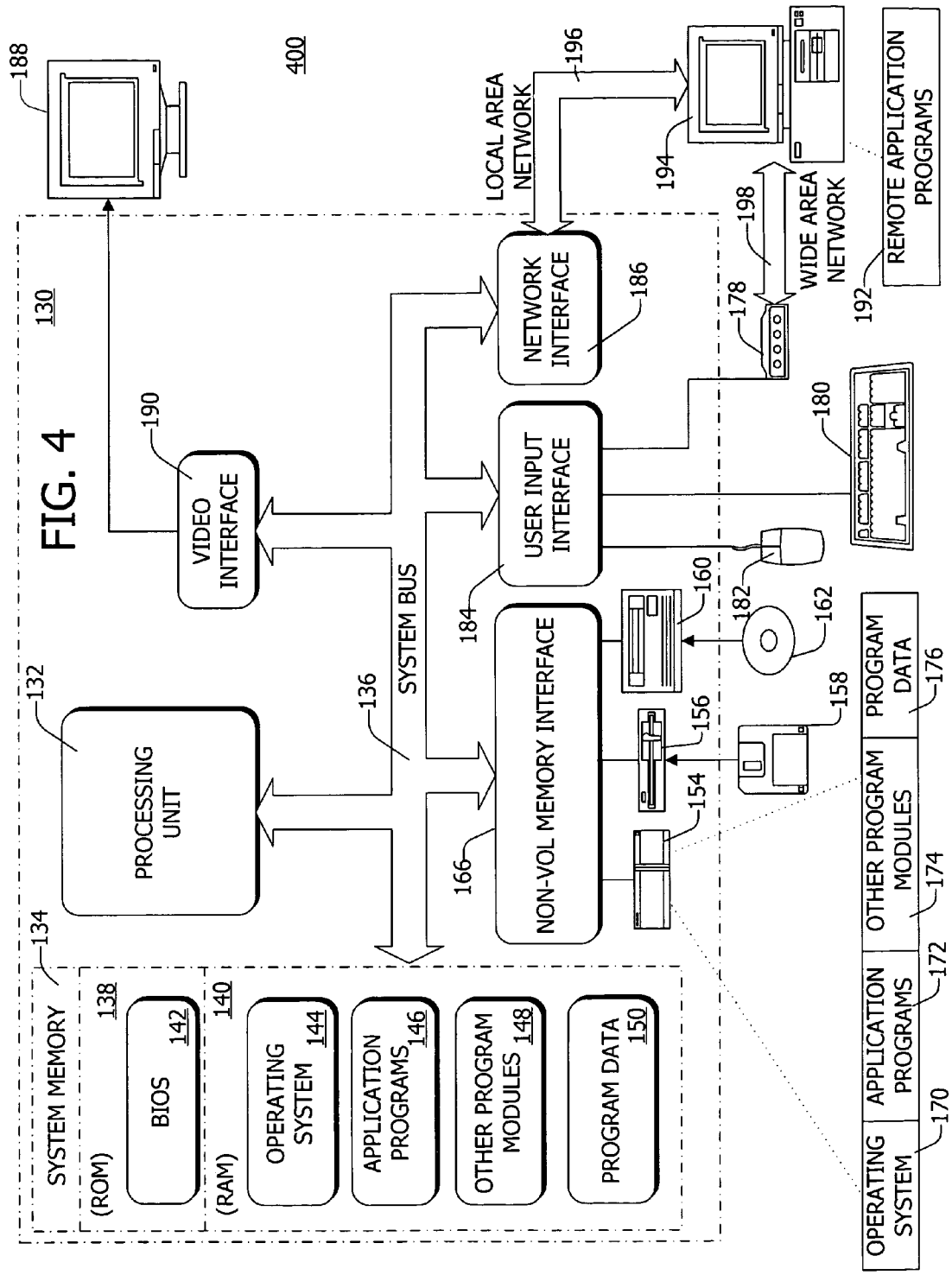

DYNAMIC OUT-OF-PROCESS SOFTWARE COMPONENTS ISOLATION FOR TRUSTWORTHINESS EXECUTION

TECHNICAL FIELD

Embodiments of the present invention relate to the field of reliable execution of computer-executable instructions for processes in an operating system. In particular, embodiments of this invention relate to process isolation to prevent malicious and unreliable computer-executable instructions from disrupting execution of the operating system and other applications.

BACKGROUND OF THE INVENTION

Component Object Model (COM) is a specification developed by Microsoft Corporation for building software components that can be assembled into programs or that add functionality to existing programs running on various software platforms. The COM specification defines a binary standard for component interoperability. That is, the COM specification does not require or depend on any particular programming language. COM also defines a component object as a piece of compiled code that provides some services to the rest of an operating system or application. By way of example, a component object may be a drag-and-drop component object that first provides a drag function responsive to an end user's selection of one or more icons moving across a display and a drop function responsive to identifying a destination on the display to handle the dragged icon(s).

Also, component objects may interact with other component objects in such a relationship as a server and a client. For example, a COM client refers to computer software that uses the services of other component objects. Consequently, a server component object refers to a component object that provides services to a COM client. In addition, there are known types of execution environments for server component objects, such as in-process, out-of-process or remote. For example, from a server component object's point of view, a server component object may execute either in-process or out-of-process in relation to a client application. An in-process component object requires the operating system to provide a pointer to communicate with the component object. For example, the operating system is required to provide resources, such as memory spaces, or the like, to execute the in-process component object. By way of example and not limitation, a server component object with dynamic-link library (DLL) capability may be considered as an in-process type of component object. On the other hand, an out-of-process type is an executable code that executes in a separate process space from that of a client application and does not share the same resources (e.g., memory space) as the client application. For example, an .EXE file may be considered an out-of-process component object. In addition, a server component object may indicate its execution environment as: in-process or out-of-process with or without preference, in-process only, or out-of-process only.

By way of illustration, a client application may be an application such as an Internet browser application that displays contents of a web page. Also, there may be a server component object that provides a function to display a multimedia file within a web page. When an end user uses the client application to visit a web page with a multimedia file, the client application requests the operating system to create a server component object to display the multimedia file in-process or out-of-process, according to the execution design and implementation of the server component object.

Unfortunately, some server component objects cannot be trusted or are unreliable. For example, non-trusted component objects (e.g., a malicious or a unreliable object) may include computer-executable instructions aimed at disrupting or interfering with the execution of the client application or operating system. Malicious computer-executable instructions or other non-trusted or unreliable component objects may require excess memory space or resources of the operating system, disable other services/functions of the operating system (e.g., spyware, adware, or the like), corrupt legitimate computer-executable instructions, or alter access privilege rights of users. The results of such interference may include causing the client application or an application to crash and/or suspending other operations of the operating system. In these situations, an end user is left with no recourse but to terminate the particular application or to reboot the computer.

In current COM implementations, the operating system generally allows the execution of a server component object in response to request from a client application. The operating system is unable to force a server component object to execute in an execution environment other than the execution environment in which the particular server component object has been designed to execute. This disadvantage exposes an operating system and client application to malicious computer-executable instructions or other non-trusted component objects. The operating system thus lacks the ability to prevent the malicious computer-executable instructions or non-trusted component objects from harming operation of an application or the operating system. That is, there is no mechanism to prevent malicious computer-executable instructions of a server component object from executing in-process relative to a client application.

Accordingly, improved out-of-process software components isolation for trustworthiness execution is desired to address at least one or more of these and other disadvantages by allowing the operating system and client application to decide whether a server component object should be executed in a requested execution environment.

SUMMARY OF THE INVENTION

Embodiments of the invention expand current COM frameworks and supporting services. Some embodiments allow an operating system and a client application to elect out-of-process execution for a created COM server component object relative to a client application despite the execution environment defined by a creator of the server component object. The invention extends the COM programming model and constructs to allow the operating system to force out-of-process execution for COM server component objects designed to run in-process.

Additionally, embodiments of the invention enable an operating system to execute a COM server component object in an execution environment (e.g., a target execution environment, a designated execution environment, or other determined execution environment) separate from an execution environment of a COM client application after analyzing the properties of the COM server component object. Also, the operating system isolates a COM server component object even if the COM server component object is not designed to be executed in any out-of-process execution environment separate from the client execution environment. Out-of-process execution prevents the unstable, defective, or malicious computer-executable instructions within a COM server component object from disrupting the functionality of processes of an application or of the operating system.

Advantageously, aspects of the invention prevent non-trusted component objects from using the address space of client application that invoke the non-trusted component objects. Embodiments of the present invention include a system and method for dynamically forcing a non-trusted COM component object to execute in a process or execution environment isolated from an execution environment associated with the operating system or another component object. An isolated execution environment protects resources (e.g., an address space) of a client application in the operating system by limiting access to the resources from a server component object. This invention adds an additional level of security for the operating system.

In accordance with one aspect, a method manages trust in an operating system. The method receives a request from a client application to create a server component object. The client application is executable in a client execution environment. The server component object has predefined properties associated therewith and the request specifies a requested execution environment for the server component object. The method analyzes the predefined properties associated with the server component object to determine an execution environment privilege associated with the server component object. The method grants the received request as a function of the determined execution environment privilege to execute the server component object in the determined execution environment.

In accordance with another aspect, one or more computer-readable media have computer-executable components for preventing execution of malicious computer-executable instructions in an operating system. An interface component receives a request from a client application create a server component object. The client application executes in a client execution environment. The server component object has predefined properties associated therewith. The request from the client application specifies a requested execution environment for the server component object. An access component analyzes the predefined properties associated with the server component object to determine a target execution environment for the server component object responsive to the request received by the interface component. An isolation component enables the server component object to execute in the target execution environment determined by the access component.

In accordance with yet another aspect, a system prevents uncontrolled access to an execution environment of a first component object by a second component object. The system includes a memory area and a processor. The memory area stores the first component object, the second component object, and one or more properties associated with the second component object. The processor is configured to execute computer-executable instructions for receiving a request from the first component object stored in the memory area to create the second component object stored in the memory area. The first component object executes in a first execution environment. The request specifies a requested execution environment for the second component object. The processor is also configured to execute computer-executable instructions for determining an execution environment privilege associated with the second component object by analyzing the properties stored in the memory area. The processor is further configured to execute computer-executable instructions for granting the received request as a function of the determined execution environment privilege.

Alternatively, the invention may comprise various other methods and apparatuses.

Other features will be in part apparent and in part pointed out hereinafter.

BRIEF DESCRIPTION OF THE DRAWINGS

FIG. 4 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
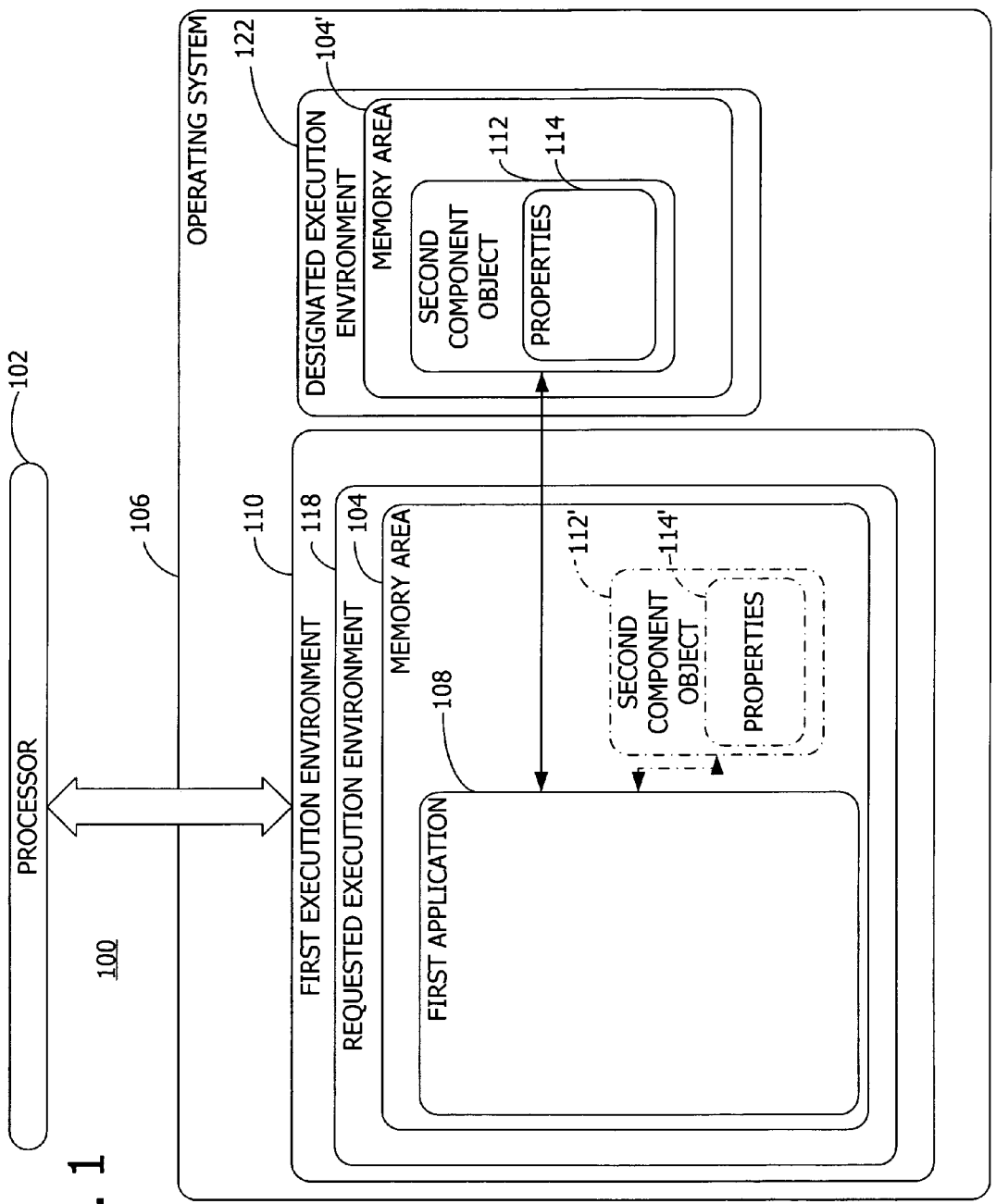
FIG. 1 is a block diagram illustrating an embodiment of a system for executing a server component object out-of-process according to the invention.

Referring now to the drawings, FIG. 1 is a block diagram illustrating an embodiment of a system 100 for executing a server component object 112 out-of-process according to the invention. In one embodiment, the system 100 may be implemented in a general purpose computing device, such as a computer 130 depicted in FIG. 4, or a handheld computing device. The system 100 has a processor 102 suitable for the system 100 or the computer 130 in FIG. 4. The system 100 also has a memory area 104 capable of providing storage in the form of removable and/or non-removable, volatile and/or nonvolatile memory for storing data for processing by the processor 102. An example of the memory area 104 is the system memory 134 of FIG. 4.

The memory area 104 provides memory space (e.g., address space) for an operating system 106. The operating system 106 may be any software that controls the allocation and usage of hardware resources, such as the memory area 104, processor time of the processor 102, disk space, and peripheral devices, such as an input/output device. In one embodiment, the operating system 106 is any operating system that adopts or incorporates the Component Object Model (COM) specification, developed by Microsoft Corporation, on various computer execution platforms. The operating system 106 also interacts with applications that adopt the COM implementation, such as a first application 108. The first application 108 may be any piece of software, computer-executable instructions, code, component object or the like, that provides some functions to an end user and/or the operating system 106. In one embodiment, the first application 108 operates in the operating system 106 and uses resources provided by the operating system 106. In another embodiment, the first application 108 is an Internet browser that enables the end user to browse web pages on the Internet. As an illustration, the first application 108 is also known as a host application.

The first application 108 includes any application that implements the COM standard and permits interactions between component objects of the first application 108 and other component objects from another application, computer-executable instructions, code, or the like. These other component objects provide additional and/or enhanced functionalities to the existing component objects of the first application 108. In one embodiment, the first application 108 has one or more component objects providing one or more functions to the first application 108. In another embodiment, a second component object 112 may be any component object that provides additional functions to the first application 108. In another embodiment, the second component object 112 may be an instance of a COM server.

Figure 2:
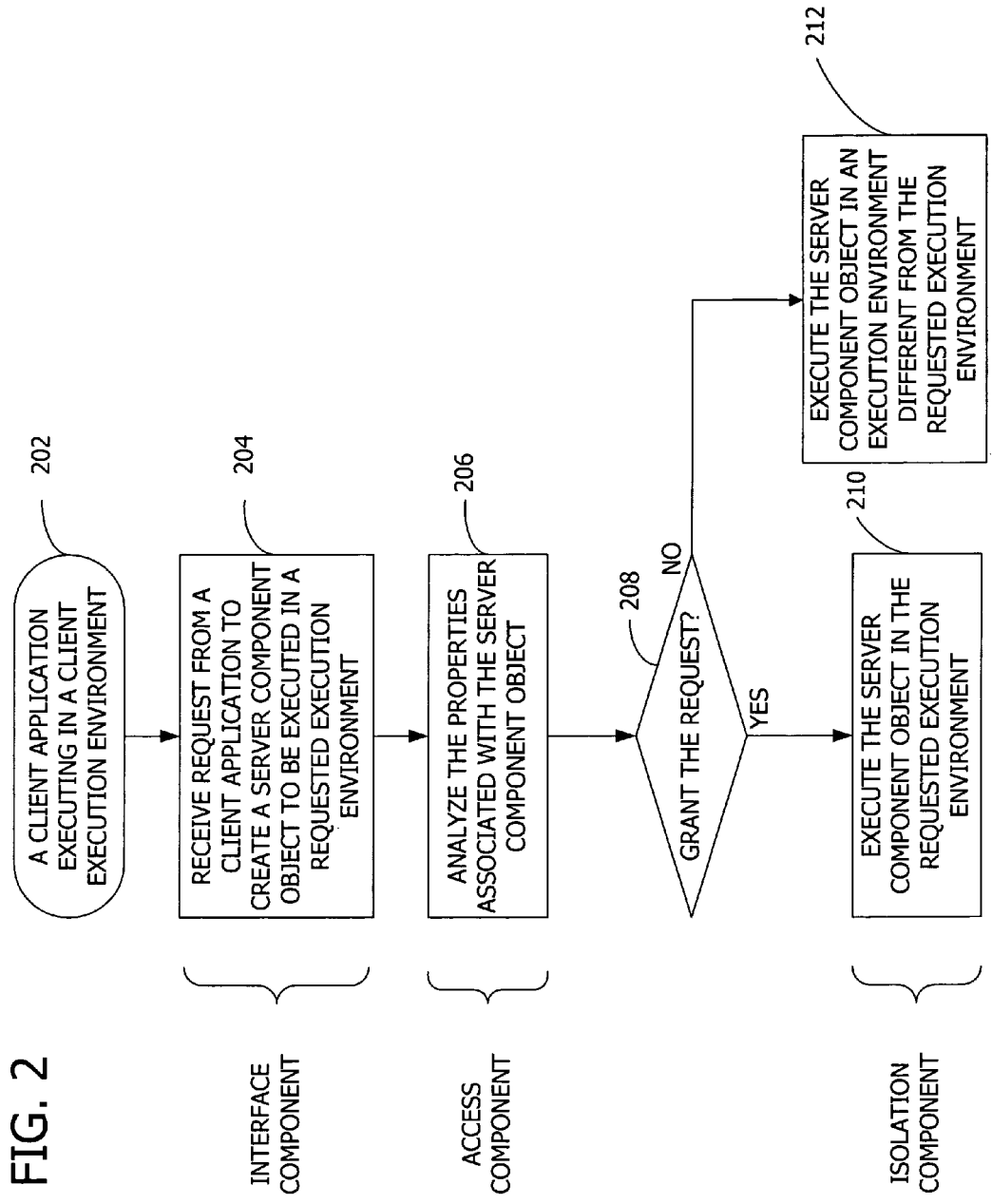
FIG. 2 is a flow chart illustrating an exemplary process flow for protecting an operating system from malicious computer-executable instructions according to an embodiment of the invention.

Initially, the first application 108 may be executed or is designed for execution in a first execution environment 110 provided by the operating system 106. In one embodiment, the first execution environment 110 may include address space, pointer assignments, memory storage areas, and/or other parameters that are necessary for the execution of the first application 108. In another embodiment, the first execution environment 110 may be a process or program for the execution of the first application 108. In yet another embodiment, the first application 108 may be a client application, a host component object or a host application. Referring to FIG. 2, the first application 108 (e.g., a client application) executes in the first execution environment 110 (e.g., a client execution environment) at 202.

Next, the first application 108 interacts with a second component object 112. In one embodiment, such interaction may be that the second component object 112 provides one or more functions to the first application 108. By way of example and not limitation, the first application 108 may be a client application and the second component object 112 may be a server component object in the sense that the second component object 112 provides some services to the first application 108. The second component object 112 includes predefined properties 114 containing information, such as information defining a manufacturer associated with the first application or the second component object, information defining a network address associated with the second component object, information defining privileges associated with the first application or the second component object, information identifying whether the second component object is associated with an operating system, information identifying a product associated with the first application or the second component object, date information, and user information associated with the first application or the second component object. The operating system 106 analyzes one or more of these predefined properties 114 of the second component objects 112, which will be described in further detail in FIG. 3.

In one embodiment, the second component object 112 is designed and/or defined to execute in a designed execution environment (e.g., in-process or out-of-process). The first application 108 includes such information in its request to the operating system 106 when creating the second component object in the operating system 106.

Initially, the first application 108 requests the operating system 106 to create a second component object 112' with its associated properties 114' for execution in a requested execution environment 118. By way of example and not limitation, the second component object 112' (as shown by the hashed line) may be executed in the requested execution environment 118 (e.g., sharing resources with the first application 108 in the first execution environment 110) under the current COM specification. Upon receiving a request from the first application 108, the operating system 106 may invoke the second component object 112' by assigning appropriate memory space, address space, and/or other resources in the memory area 104 to prepare for the execution of the second component object 112'. In one embodiment, when the operating system 106 receives the request from the first application 108, the requested execution environment 118 is an execution environment defined by programmers who designed the second component object 112.

In contrast, as a result of analyzing the properties 114 and applying additional restrictions (to be discussed in detail in FIGS. 2 and 3), the operating system 106 may execute the second component object 112 in a designated execution environment 122 separate from the requested execution environment 118. In another embodiment, the operating system 106 may isolate the second component object 112 in the designated execution environment 122 using a memory area 104' even if the second component object 112 is not designed to be executed in the designated execution environment 122.

Referring to FIG. 2, a flow chart illustrates an exemplary process flow for protecting an operating system 106 from malicious computer-executable instructions according to an embodiment of the invention. A client application such as the first application 108 in FIG. 1 executes at 202 in a client execution environment such as the first execution environment 110 in FIG. 1. An interface component of the operating system 106 receives a request from the client application to create at 204 a server component object such as the second component object 112 in FIG. 1. At 206, an access component of the operating system 106 analyzes the predefined properties 114' associated with the server component object to determine an execution environment privilege associated with the server component object. By way of example and not limitations, the access component of the operating system 106 determines whether to execute the server component object in an execution environment requested by the server component object such as the requested execution environment 118 in FIG. 1 or in an execution environment different from the requested execution environment (e.g., the designated execution environment 122 in FIG. 1). Such determination will be described in further detail in FIG. 3.

At 208, in analyzing the predefined properties, the access component determines whether to grant the received request from the client application. If the access component grants the request, an isolation component of the operating system 106 executes the server component object in the requested execution environment. If the access component denies the received request at 208, the isolation component executes the server component object in an execution environment different from the requested execution environment at 212. If the server component object cannot be executed out-of-process (e.g., without crashing), the isolation component executes the server component object in a surrogate execution environment which emulates, to the server component object, the in-process execution environment.

In one embodiment, the isolation component may apply additional restrictions to the execution environment of the server component object. Such additional restrictions may include applying a security context of an end user, (e.g., whether an administrator, User A, or User B, is permitted to execute the second component object 112' in the requested execution environment 118), the ability to disable certain services (e.g., spyware) per process, limiting memory usage in the memory area 104, and applying communication restrictions between component objects executing in the same process (e.g., two objects from different web sites spawned from the same Internet browser process).

Executing the server component object in an execution environment different from the requested execution environment at 212 prevents possibly malicious or non-trusted computer-executable instructions in the server component object from executing in the requested execution environment. The possibly malicious computer-executable instructions may attempt to share process spaces and/or resources in the client execution environment and, as a result of this sharing, the server component object may hinder/interfere with the execution of the client application and/or the operating system 106. By executing the server component object in the execution environment different from the requested execution environment, the operating system 106 isolates the server component object. The server component object may not override the result of the invention method. That is, the server component object may not reject the decision at 208.

Figure 3:
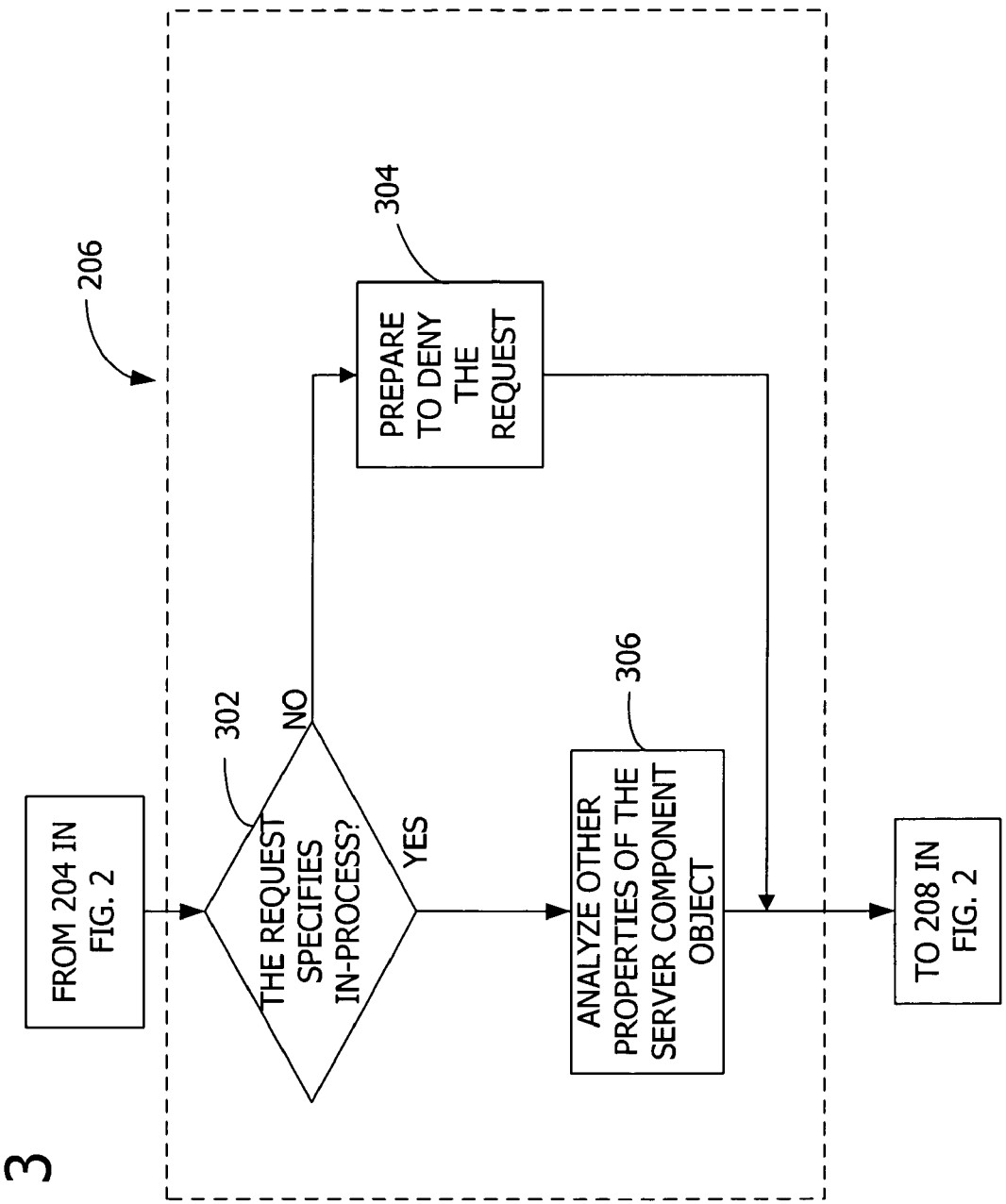
FIG. 3 is a flow chart illustrating an exemplary process flow for determining an execution environment privilege associated with a server component object by analyzing predefined properties of the server component object according to an embodiment of the invention.

Referring next to FIG. 3, a flow chart illustrates an exemplary process flow for determining an execution environment privilege associated with a server component object such as the second component object 112 in FIG. 1 by analyzing predefined properties of the server component object according to an embodiment of the invention. In particular, FIG. 3 illustrates analysis of the predefined properties of the server component object at 206 in FIG. 2 in further detail.

At 302, the operating system 106 determines whether the requested execution environment specifies an in-process execution environment. A server component object may be capable of executing in either an in-process or an out-of-process execution environment. If the in-process execution environment is specified, the operating system 106 analyzes other predefined properties of the server component object at 306 to determine whether to grant the request. For example, the operating system 106 may analyze whether the requested execution environment includes protected aspects of the operating system. If the in-process execution environment is not specified, then the operating system 106 prepares to deny the request at 304 by, for example, marking or tagging the server component object for execution in an execution environment different from the in-process execution environment.

Hence, by analyzing the predefined properties associated with the server component object at 206 and as illustrated in FIG. 3, the invention enables and/or assists the operating system 106 in isolating the server component object from executing in the client execution environment. For example, once the operating system 106 determines that a server component object is privileged or trusted to be executed in a client execution environment, the operating system 106 grants such a request.

In one embodiment, the invention allows the client application to invoke in-process server component objects that are not related to an operating system. For such server component object, some or all methods of the invention may be performed. For example, such server component object may be allowed to execute in-process unhindered.

The present invention expands current COM implementations by implementing a client extensible model that embodies at least some of the features of the invention. In operation, a client application may be an Internet browser having one or more functions executing in a client execution environment. Initially, when an end user uses the client application to browse web pages on the Internet, the client application uses resources from the operating system in displaying contents of a web page. When the end user browses to a web page that contains a multimedia file, the web page or the multimedia file may contain a second component object for displaying the multimedia file in the client application. The second component object may be designed to execute in-process, as defined by programmers of the second component object.

The client application interacts with the second component object when the end user visits a web page with a multimedia file. The client application requests the operating system to create the second component object so the end user may view the contents of the multimedia file. The operating system analyzes the request and the second component object to determine whether to grant or deny the request. In particular, the operating system determines whether the request is for an in-process execution environment. If the request indicates an out-of-process execution environment rather than an in-process execution environment, the operating system grants the request and executes the second component object out-of-process. If the request specifies an in-process execution environment, the operating system analyzes predefined properties of the second component object, such as information defining a network address of the second component object, and/or other information. Based on these properties, the operating system determines whether to grant the request from the client application to execute the second component object in the client execution environment (e.g., in-process).

If the request specifies in-process execution and the operating system denies the request based on the analyzed properties, the operating system executes the second component object in an execution environment (e.g., out-of-process) different from the requested execution environment. That is, the second component object does not share the resources with the client application in the client execution environment. In so doing, the operating system isolates the second component object in a separate process. The end user is still able to view the contents of the multimedia file when the operating system isolates the second component object, but if there is a piece of malicious computer-executable instructions in the second component object, the execution in the separate process does not interfere with the execution of the client application or the operating system. In turn, the client application does not share resources with the second component object in its client execution environment and therefore reduces the chance of being crashed by the malicious computer-executable instructions of the second component object.

In some embodiments, the second component object designed for in-process execution may not be capable of out-of-process execution. For such component objects, the operating system creates a surrogate execution environment separate from the in-process execution environment in which to execute the second component object. To the second component object, the surrogate execution environment appears to be the in-process environment. For example, the end user is able to view the contents of the multimedia.

If the request specifies in-process execution and the operating system grants the request, the operating system executes the second component object in the client execution environment (e.g., in-process). That is, the second component object shares the resources of the client application in the client execution environment.

The operating system may also apply additional restrictions such as administrator access privilege and/or at least other restrictions to the execution environment of the second component object.

Referring to FIG. 4, it shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 4 illustrates operating system 144, application programs 146, other program modules 148, and program data 150.

The computer 130 may also include other removable/non-removable, volatile/nonvolatile computer storage media. For example, FIG. 4 illustrates a hard disk drive 154 that reads from or writes to non-removable, nonvolatile magnetic media. FIG. 4 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 4, provide storage of computer readable instructions, data structures, program modules and other data for the computer 130. In FIG. 4, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 4 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 4 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (32EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products and methods without departing from the scope of the invention, it is intended that all matter contained in the above description and shown in the accompanying drawings shall be interpreted as illustrative and not in a limiting sense.

What is claimed is:

1. A method of managing trust in an operating system of a computing device, said method comprising:

receiving a request from a client application in a client execution environment executing in the operating system to create a server component object, said client application being executable in the client execution environment, said server component object having predefined properties associated therewith for providing services to the client application in the operating system of the computing device, said request specifying a requested execution environment for the server component object to be executed in the same operating system, said requested execution environment comprising one or more of the following: in-process, out-of-process, and remote;

analyzing the predefined properties associated with the server component object to determine whether an execution environment privilege associated with the server component object matches the requested execution environment;

if the determined execution environment privilege matches the requested execution environment, granting the received request to execute the server component object in the requested execution environment; and if the determined execution environment privilege does not match the requested execution environment, executing the server component object in a surrogate execution environment, said surrogate execution environment being different from the client execution environment and the requested execution environment.

2. The method of claim 1, wherein granting the received request comprises enabling the server component object to execute in the requested execution environment.

3. The method of claim 1, wherein granting the received request comprises enabling the server component object to execute in the client execution environment.

4. The method of claim 1, wherein granting the received request comprises enabling the server component object to execute in an execution environment different from the requested execution environment.

5. The method of claim 1, wherein granting the received request comprises enabling the server component object to execute in an execution environment different from the client execution environment.

6. The method of claim 1, further comprising:
creating the surrogate execution environment.

7. The method of claim 1, wherein analyzing the predefined properties associated with the server component object and granting the received request comprise analyzing the predefined properties associated with the server component object and granting the received request only when the requested execution environment specifies the client execution environment.

8. The method of claim 1, wherein receiving the request from the client application to create the server component object comprises receiving a request including a requested execution environment from the client application to create the server component object, said requested execution environment being specified by the server component object for the server component object.

9. The method of claim 1, wherein receiving the request from the client application to create the server component object comprises receiving a request from a component object model (COM) client application to create a COM server component object.

10. The method of claim 1, wherein granting the received request further comprises applying one or more restrictions to the requested execution environment.

11. The method of claim 1, further comprising notifying the client application in response to granting the received request.

12. The method of claim 1, wherein the predefined properties of the server component object comprise one or more of the following: information defining a manufacturer associated with the client application, information defining a manufacturer associated with the server component object, information defining a network address associated with the server component object, information defining privileges associated with the server component object, information defining privileges associated with the client application, information identifying whether the server component object is associated with an operating system, information identifying a product associated with the server component object, information identifying a product associated with the client application, date information, user information associated with the client application and client execution environment, and user information associated with the server component object.

13. The method of claim 1 further comprising receiving an indication from the client application to perform said analyzing the predefined properties associated with the server component object to determine an execution environment privilege and said granting the received request as a function of the determined execution environment privilege.

14. The method of claim 1 further comprising isolating execution of the server component object in the client execution environment as a function of analyzing the predefined properties of the server component object.

15. The method of claim 1, wherein one or more computer-storage media have computer-executable instructions for performing the method of claim 1.

16. One or more computer storage media having computer-executable components for preventing execution of malicious computer-executable instructions in an operating system, said components comprising:

an interface component for receiving a request from a client application in a client execution environment executing in the operating system in a computing device to create a server component object, said client application executing in the client execution environment, said server component object having predefined properties associated therewith for providing services to the client application in the operating system of the computing device, said request specifying a requested execution environment for the server component object to be executed in the same operating system in the computing device;

an access component for analyzing the predefined properties associated with the server component object to determine whether the received request from the client application includes sufficient privilege for executing the server component object in the requested execution environment; and an isolation component;

wherein the access component grants the received request by executing the server component object in the requested execution environment if it is determined that there is sufficient privilege for executing the server component object in the requested execution environment; and wherein the isolation component enables the server component object to be executed in a target execution environment determined by the access component if it is determined that there is insufficient privilege for executing the server component object in the requested execution environment, said target execution environment being different from the requested execution environment.

17. The computer storage media of claim 16, wherein the isolation component is adapted for enabling the server component object to execute in the requested execution environment.

18. The computer storage media of claim 16, wherein the isolation component is further adapted for:
creating the surrogate execution environment; and
enabling the server component object to execute in the created surrogate execution environment.

19. The computer storage media of claim 16, wherein the access component is further adapted for enabling the server component object to execute in the target execution environment only when the requested execution environment specifies the client execution environment.

20. The computer storage media of claim 16, wherein the requested execution environment is specified by the server component object for the server component object.

21. The computer storage media of claim 16, wherein the interface component is adapted for receiving a request from a component object model (COM) client application to create a COM server component object.

22. The computer storage media of claim 16, wherein the requested execution environment comprises one or more of the following: in-process, out-of-process, and remote.

23. The computer storage media of claim 16, wherein the isolation component is further adapted for applying one or more restrictions to the target execution environment.

24. The computer storage media of claim 16 further comprising a registration component for notifying the client application of the target execution environment determined by the access component.

25. The computer storage media of claim 16, wherein the properties of the server component object comprise one or more of the following: information defining a manufacturer associated with the client application, information defining a manufacturer associated with the server component object, information defining a network address associated with the server component object, information defining privileges associated with the server component object, information defining privileges associated with the client application, information identifying whether the server component object is associated with an operating system, information identifying a product associated with the server component object, information identifying a product associated with the client application, date information, user information associated with the client application and the client execution environment, and user information associated with the server component object.

26. The computer storage media of claim 16, wherein the interface component is further adapted for receiving an indication from the client application to execute the access component and the isolation component.

27. The computer storage media of claim 16, wherein the isolation component is further adapted for isolating execution of the server component object in the client application by executing the access component.

28. A computing device system for preventing uncontrolled access to an execution environment of a first component object by a second component object, said system comprising:
 a memory area for storing the first component object, the second component object, and one or more properties associated with the second component object; and
 a processor configured to execute computer-executable instructions for:
 receiving a request from the first component object stored in the memory area executing in a first execution environment of an operating system of the computing device system to create the second component object stored in the memory area, said first component object executing in the first execution environment, said request specifying a requested execution environment for the second component object to be executed in the operating system for providing services to the first component object in the operating system, said requested execution environment comprising one of the following: in-process, out-of-process, or remote, said in-process requested execution environment requiring the operating system to provide a pointer to communicate with the second component object, said out-of-process execution environment being an execution environment that executes in a separate process space from that of the client application and does not share resources as the client application;
 determining an execution environment privilege associated with the second component object by analyzing the properties stored in the memory area;
 if the requested execution environment is an in-process execution environment for the second component object to be executed in the same operating system and the determined execution environment privilege matches the requested execution environment, granting the received request by executing the second component object in the requested execution environment; and
 if the requested execution environment is an in-process execution environment for the second component object to be executed in the same operating system and the determined execution environment privilege does not match the requested execution environment denying the received request by forcing an out-of-process execution environment for the second component object such that the second component object does not share resources with the client application in the client execution environment.

29. The system of claim 28, wherein the first execution environment comprises an address space.

30. The system of claim 28, wherein the first component object is a component object model (COM) client application and wherein the second component object is a COM server component object.

31. The system of claim 28, wherein the processor further includes computer-executable instructions for receiving an indication from the first component object for the processor to perform said determining an execution environment privilege associated with the second component object by analyzing the properties stored in the memory area and said granting the received request as a function of the determined execution environment privilege.

32. The system of claim 28, wherein the processor further includes computer-executable instructions for isolating execution of the second component object in the first component execution environment as a function of analyzing the properties of the second component object.

* * * * *

UNITED STATES PATENT AND TRADEMARK OFFICE
CERTIFICATE OF CORRECTION

PATENT NO. : 7,587,594 B1 Page 1 of 1
APPLICATION NO. : 10/929339
DATED : September 8, 2009
INVENTOR(S) : Kavalam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1164 days.

Signed and Sealed this

Twenty-first Day of September, 2010

David J. Kappos
*Director of the United States Patent and Trademark Office*